United States Patent
Robinson et al.

(10) Patent No.: US 7,313,951 B2
(45) Date of Patent: Jan. 1, 2008

(54) BRAKE PEDAL POSITIONING APPARATUS AND METHOD

(75) Inventors: George W. Robinson, Tacoma, WA (US); Brian T. Moore, Bellevue, WA (US); James N. Banyai, Renton, WA (US)

(73) Assignee: The Boeing Company, Chicago, IL (US)

( * ) Notice: Subject to any disclaimer, the term of this patent is extended or adjusted under 35 U.S.C. 154(b) by 747 days.

(21) Appl. No.: 10/798,303

(22) Filed: Mar. 12, 2004

(65) Prior Publication Data

US 2005/0199091 A1    Sep. 15, 2005

(51) Int. Cl.
*G01L 5/28* (2006.01)

(52) U.S. Cl. ........................................... 73/132

(58) Field of Classification Search ............. 73/121, 73/128, 129, 130, 131, 132
See application file for complete search history.

(56) References Cited

U.S. PATENT DOCUMENTS

| | | | | | |
|---|---|---|---|---|---|
| 3,662,593 | A | * | 5/1972 | Pirrello et al. | 73/132 |
| 3,788,131 | A | * | 1/1974 | Markey | 73/132 |
| 3,877,299 | A | * | 4/1975 | Clayton et al. | 73/132 |
| 3,977,241 | A | * | 8/1976 | Asmus et al. | 73/132 |
| 3,991,609 | A | * | 11/1976 | Asmus et al. | 73/132 |
| 3,995,475 | A | * | 12/1976 | Cline | 73/126 |
| 5,363,027 | A | * | 11/1994 | Noguchi | 318/573 |
| 5,372,035 | A | * | 12/1994 | Ogawa et al. | 73/117 |
| 5,394,743 | A | * | 3/1995 | Noguchi et al. | 73/117 |
| 6,363,774 | B2 | * | 4/2002 | Duff | 73/40 |
| 6,681,620 | B2 | * | 1/2004 | Sakamoto et al. | 73/132 |
| 6,736,003 | B2 | * | 5/2004 | Takeda et al. | 73/132 |
| 7,021,131 | B2 | * | 4/2006 | Harrison et al. | 73/132 |
| 2001/0045124 | A1 | * | 11/2001 | Mouck et al. | 73/132 |
| 2002/0017129 | A1 | * | 2/2002 | Duff | 73/40 |
| 2002/0134168 | A1 | * | 9/2002 | Sakamoto et al. | 73/818 |
| 2002/0134169 | A1 | * | 9/2002 | Takeda et al. | 73/818 |
| 2005/0072222 | A1 | * | 4/2005 | Harrison et al. | 73/132 |

OTHER PUBLICATIONS

Amazon.Com, "Quick-Grip 00512 Bar Clamps" 1 pg. Feb. 2, 2004.
Honeywell Company "Sensotec Brand Products" 4 pgs. Dec. 1, 2003.

* cited by examiner

*Primary Examiner*—Eric S. McCall
(74) *Attorney, Agent, or Firm*—Baker & Hostetler LLP

(57) ABSTRACT

A pedal positioning apparatus has a ratcheting assembly that includes a handle, a shaft, an attachment arm that extends from the handle and at least one trigger. The pedal positioning apparatus also includes a lever arm having a first end and a second end. The lever arm is pivotally connected to the handle at one end and also includes a pedal hooking feature at the other end. The pedal positioning apparatus further includes a bracket connected to the bar to support a pedal-contacting pad.

19 Claims, 6 Drawing Sheets

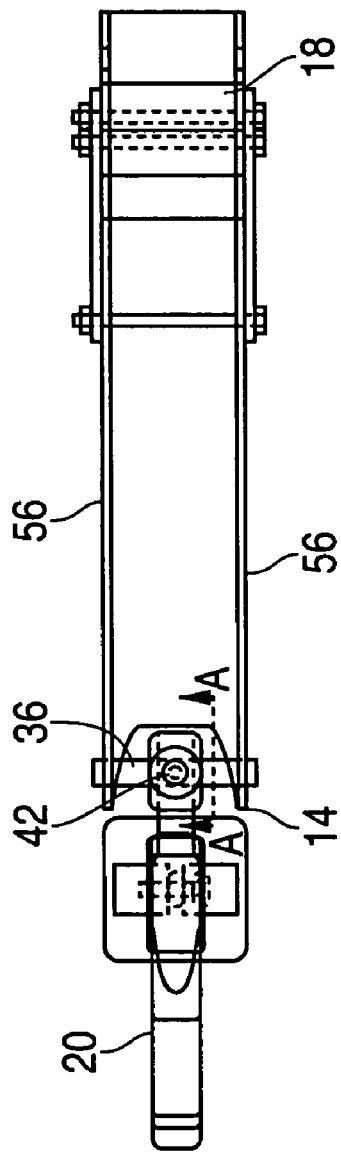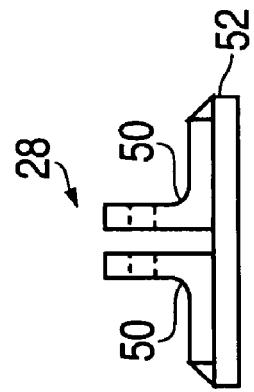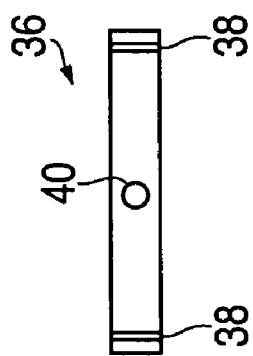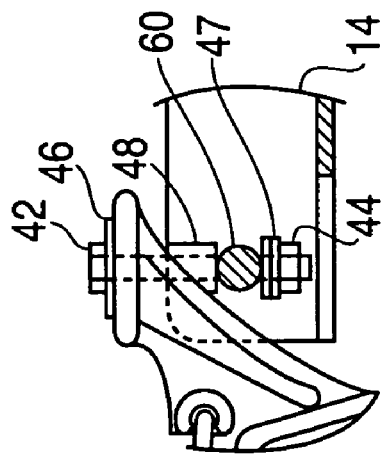

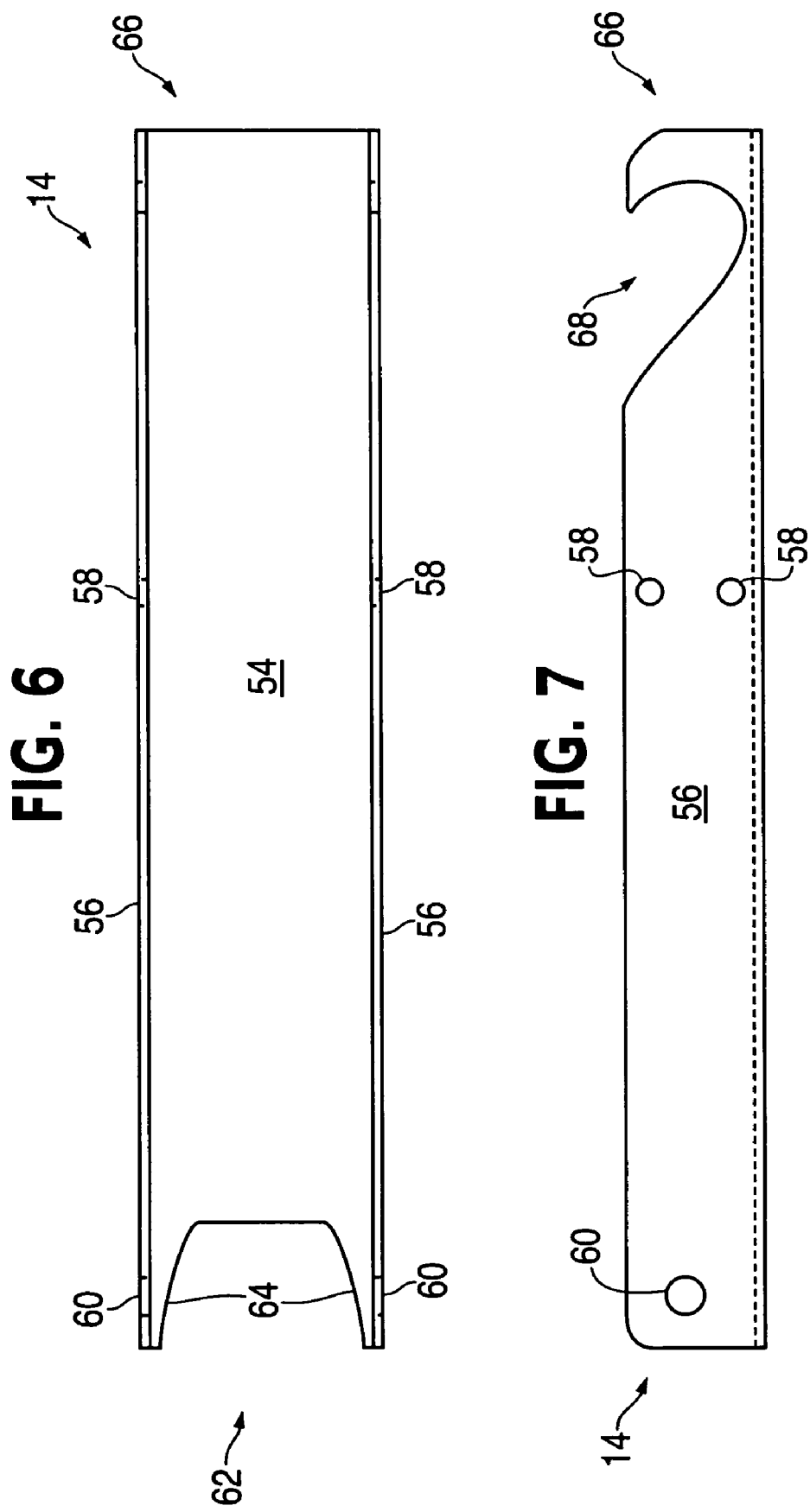

BRAKE PEDAL POSITIONING APPARATUS AND METHOD

FIELD OF THE INVENTION

The present invention relates generally to the field of functional testing for pedal activated braking systems such as in an airplane or other vehicle brake systems where a human operator applies the brakes. More particularly, the present invention relates to an apparatus and method for providing consistent setup and testing of brake pedal displacement and force required to depress the brake pedal and the resultant braking force at the wheels, for example commercial airplane braking systems.

BACKGROUND OF THE IVENTION

During the manufacture and final assembly of commercial airplanes and the like, various airplane systems are functionally tested, including the braking system. One of the essential functional tests administered to the braking system of commercial airplanes is a test to measure the amount of force the operator or pilot must apply to the individual brake pedals to stop a taxiing airplane. This test is typically conducted measuring three parameters: brake pedal position in terms of degrees of rotation; brake pedal force in terms of pounds of force being applied to the pedal; and the hydraulic pressure delivered to the brakes as a result of the brake pedal position. In many airplanes, there are two brake pedals generally parallel to each other, with each pedal hinge mounted at its bottom near the cockpit floor. With the development of power assist brakes in airplanes and other vehicles large braking forces are available, which enables the operator to apply significantly more breaking force to the tires and wheels than would be capable manually. This large force can stop the tires from rotating and the resultant skidding can wear through the tire carcass causing the tire to flat spot and possibly blow out. Thus, various industries such as the automobile industry have employed a biasing element, such as a spring, in the pedal circuit to give the operator a sense of how much braking force is being applied to the wheels and tires when the operator depresses the pedal.

Commercial airplanes, however, unlike automobiles, employ two brake pedals and can have 3000 psi available for braking, which can cause failure of the tires and wheels of the airplane if the application of the breaking force is not controlled. Therefore, as the operator or pilot depresses the brake pedals and the pedals rotate to various positions, each position of the pedal has a resultant pedal push back force which corresponds to hydraulic pressure being applied at the brakes. This push back force indicates to the operator or pilot how much braking force is being applied to the tires.

Currently, the aforementioned testing of the pedal position is accomplished via a multi-step procedure which includes attaching instrumentation to each of the brake pedals. This instrumentation is commonly referred to as a load cell and provides a read out of the force, in terms of pounds, being applied to the pedals and it also indicates the position of the pedals in terms of degrees which corresponds to the applied braking force at the tires. Also, each load cell typically operates in conjunction with an electrical box which provides a readout for each parameter identified above.

Next, operator or pilot force or pressure is applied to the load cells and hence to the brake pedals. This is currently accomplished manually by employing a person, usually a functional test mechanic, to simulate a pilot manually depressing the load cells and thus the brake pedals of the commercial aircraft being tested. While pressure from the operators foot is applied to the load cells attached to the pedals, the functional test mechanic interprets the data displayed by the electrical boxes. The brake system then is adjusted accordingly.

The aforementioned testing procedure has drawbacks however, because the procedure can be time consuming in terms of man hours, requiring multiple people to perform the various tasks. The procedure is also physically demanding.

The pedal forces that are reproduced are typically around 80-90 pounds at the upper end, and the operator usually has to sustain this pressure for 2-3 minutes while the brake system is adjusted. This duration of time can approach ten minutes or longer, depending the type and extent of adjustment required. As a result, the operator oftentimes becomes fatigued and his or her legs begin to quiver, causing the values indicated on the electrical boxes to vary and become imprecise due to the application of inconsistent or non-constant foot pressure. The mechanic adjusting the brake pressure at the tires is then continually chasing the required values.

Accordingly, there is a need in the art to provide an apparatus and method that allows for the efficient, precise functional testing for pedal operated systems such as brake systems and the like, that is ergonomic and less fatiguing.

SUMMARY OF THE INVENTION

The foregoing needs are met, to a great extent, by the present invention, wherein the aspects of a mechanical pedal positioning apparatus are provided. The invention is comprised of a shaft, a ratchet and lever assembly. The ratchet assembly includes a handle translatable along the shaft. The pedal positioning apparatus includes a lever arm having a first end and a second end that is pivotally connected to the ratchet assembly at the first end of the lever arm. The pedal positioning apparatus further includes a pad attached to the second end of the lever arm that contacts the pedal when the ratchet assembly is translated.

In accordance with another embodiment of the present invention, a pedal positioning apparatus is provided, comprised of a means for supporting the ratchet shaft on a surface. The apparatus also includes a means for clamping onto the supporting means and translating along the supporting means. The apparatus further includes a lever arm having a first end and a second end pivotally connected to the means for clamping at the first end of the lever arm. The apparatus further includes a contacting means attached to the second end of the lever arm for contacting a pedal and applying force to the pedal when the clamping means is translated along the supporting means.

In accordance with yet another embodiment of the present invention, an apparatus to position a pedal for use with a clamp having a handle translatable along a shaft is provided. The apparatus includes a lever arm having a first end and a second end wherein the first end is pivotally connected to the clamp. The apparatus also includes a pad connected to the second end of the level arm that contacts a pedal when the handle is translated along the shaft.

In accordance with still another embodiment of the present invention, a method for positioning a pedal and applying a force to a pedal is provided, comprising the steps of: applying a pedal positioning apparatus to the pedal, wherein the pedal positioning apparatus comprises: a shaft; a ratchet assembly comprising a handle translatable along the shaft; a lever arm having a first end and a second end, and pivotally connected to the ratchet assembly at the first end of the lever arm; and a pad attached to the second end of the lever arm that contacts the pedal and is configured to apply force to the pedal when the ratchet assembly is translated; translating the handle in a direction opposite the foot; contacting the pad with the pedal; and locking the handle in position on the shaft.

In accordance with still another embodiment of the present invention, a pedal positioning apparatus is provided, comprising a ratchet assembly having a handle with an aperture, wherein a shaft passes through the aperture. The ratchet assembly also includes an attachment arm that extends from the handle and has at least one trigger. The pedal positioning apparatus further includes a lever arm having first and second end that is attached to the attachment arm via a pivoting connection. The lever arm includes a first side wall, second side wall and a base extending between the first and second side walls. The lever arm additionally includes a pedal hooking feature oriented at the second end of the lever arm. The pedal positioning apparatus also includes a bracket assembly and a pad member connected to the bracket assembly.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 2 is a top view of the pedal positioning apparatus illustrated in FIG. 1.

FIG. 3 is a detailed sectional view taken along line A-A of FIG. 2.

FIG. 4 is detailed side view of a pin employed in the pedal positioning apparatus in accordance with an embodiment of the present invention.

FIG. 5 is a side view of a foot of the pedal positioning apparatus in accordance with an embodiment of the present invention.

FIG. 6 is a top view of a lever arm employed in the pedal positioning apparatus in accordance with an embodiment of the present invention.

FIG. 7 is a side view of the lever arm illustrated in FIG. 5.

DETAILED DESCRIPTION

Figure 1:
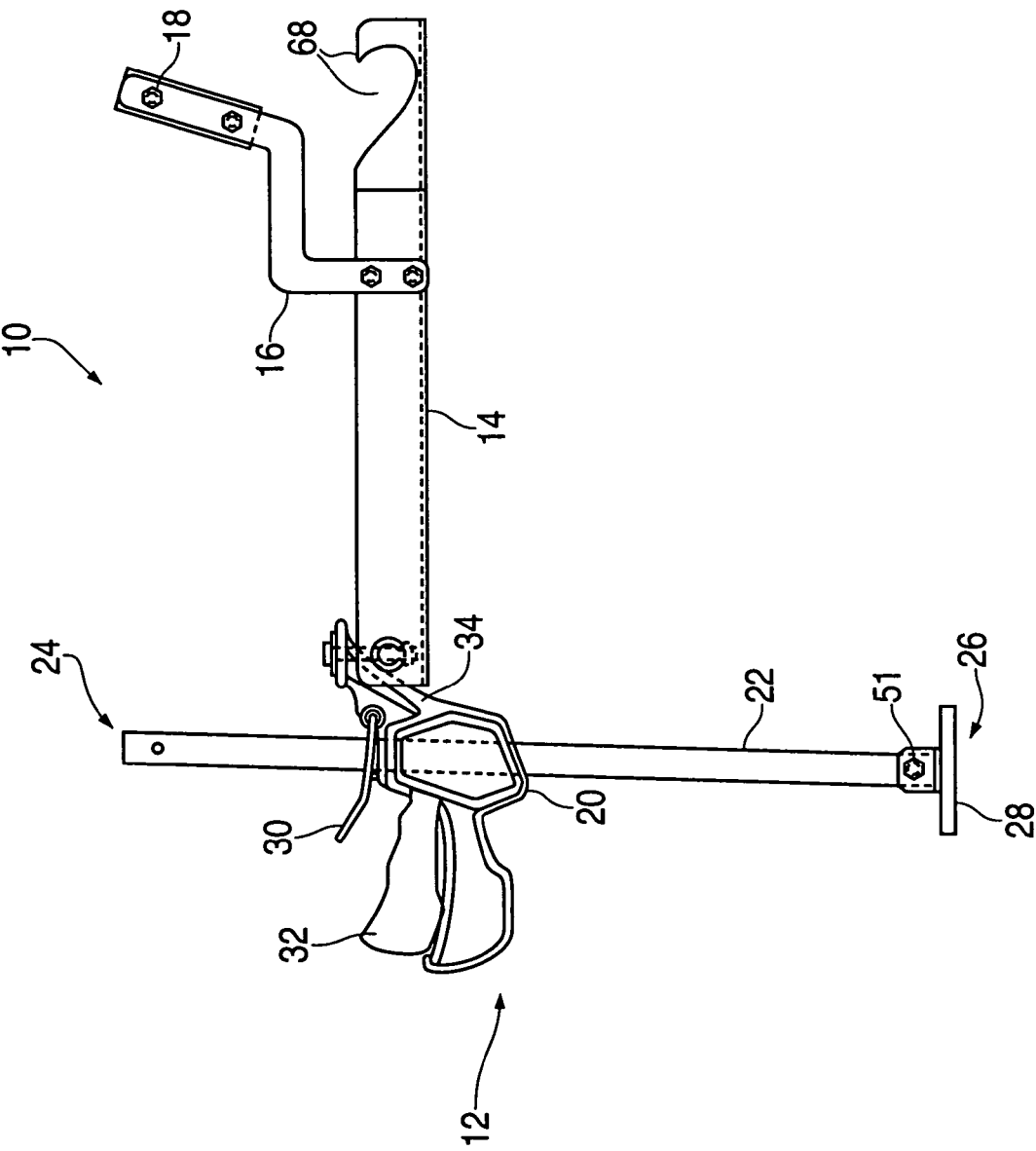
FIG. 1 is a side view of a pedal positioning apparatus in accordance with an embodiment of the present invention.

Various preferred embodiments of the present invention provide for a pedal positioning apparatus and method for positioning and applying a force to a brake pedal or the like, for use during functional testing of a brake or similar pedal operated system of a commercial airplane. In some arrangements, the apparatus and method are utilized in combination with additional instrumentation such as a load cell, while in other arrangements the load cell may not be utilized. It should be understood, however, that the present invention is not limited in its application to brake pedals or brake systems or commercial aircraft, but, for example, can be used with other systems and/or in other industries that require the precise positioning of pedal operated systems or the like. Preferred embodiments of the invention will now be further described with reference to the drawing figures, in which like reference numerals refer to like parts throughout.

Referring now to FIGS. 1 and 2, a pedal positioning apparatus, generally designated 10, is depicted having a ratcheting assembly, generally 12, a lever arm 14 pivotally connected to the ratcheting system 12 and two side brackets 16 (only one is pictured), each connected to the lever arm 14. The pedal positioning apparatus 10 also includes a pad member 18 attached to, and spanning between, side brackets 16.

Referring now specifically to FIGS. 1-4, the ratcheting assembly 12 includes a handle 20 having an aperture (not pictured) through which a shaft 22 passes. The shaft 22 has a first end 24 and a second end 26 with a foot 28 attached to the second end 26. The handle 20 includes a first actuating member or trigger 30 that operates in combination with a second actuating member or trigger 32, both of which allow the handle 20 to translate along the shaft 22. The triggers 30, 32 function to lock or retain the handle assembly 20 at a desired axial location along the shaft 22, and also can be operated to incrementally advance the handle assembly 20 in the direction down from the foot 28. The handle 20 also includes an attachment arm 34 that extends from the handle 20. The lever arm 14 pivotally connects to the ratcheting system 12 via the attachment arm 34. One preferred embodiment of the ratcheting assembly 12 is the Quick-Grip 00512 Bar Clamp manufactured by Irwin, however alternative ratcheting systems may be employed and/or utilized.

In the embodiments utilizing the Quick-Grip 00512 Bar Clamp, the Quick-Grip 00512 Bar Clamp is modified by removing the small, end clamp from the shaft of the Quick-Grip 00512 Bar Clamp. The Quick-Grip 00512 Bar Clamp is further modified by removing the pad from the handle clamp of the Quick-Grip 00512 Bar Clamp and boring or drilling a hole through the handle clamp face. In these embodiments the handle clamp functions as the attachment arm 34 in the embodiments depicted in the figures. Finally, the Quick-Grip 00512 Bar Clamp is also modified by attaching a foot or base to the end of the shaft of the Quick-Grip 00512 Bar Clamp.

Referring now specifically to FIGS. 2-4, the lever arm 14 is pivotally coupled and/or connected to the attachment arm 34. This connection comprises a pin 36 having a diameter and annular grooves 38 on each end. The pin 36 includes a bore 40 preferably positioned equidistant from the ends of the pin 36. The bore 40 extends through the entire diameter of the pin 36. The pin 36 is retained to the lever arm 14 via the annular grooves 38 and extends horizontally between the side wall of the lever arm's 14 side. As illustrated in FIGS. 2 and 3, the aforementioned pivoting connection also includes a vertical bolt 42, that is utilized in combination with at least one nut 44 and a plurality of washers 46, 47.

As illustrated in FIGS. 2 and 3, the vertical bolt 42 is inserted through a hole in the attachment arm 34 (not pictured) and extends through a spacer 48. The vertical bolt 42 then proceeds to intersect the pin 36, extending through the bore 40 of the pin 36. The vertical bolt 42 is retained in position by the combination of the washers 46 and the nut 44. Preferably, a first washer 46 is positioned between the top end of the bolt 42 and the attachment arm 34, while at least one washer 47, preferably two, is positioned between the nut 44 and the spacer 48. The washers 47 combine with the spacer 48 to trap or retain the pin 36 at vertical, axial position along the bolt 42.

Figure 11:
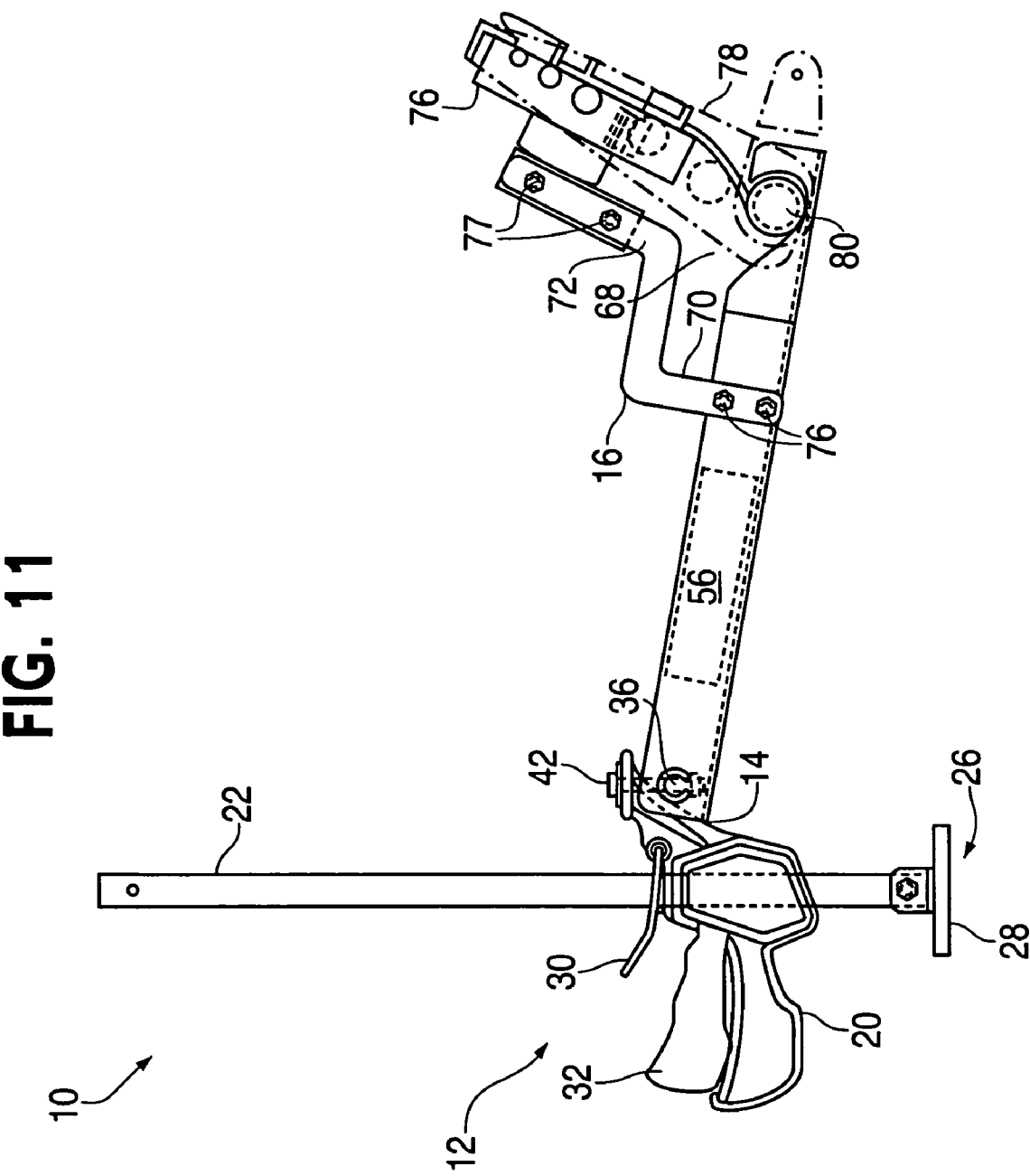
FIG. 11 is a side view of a pedal positioning apparatus in combination with a load cell on a brake pedal in accordance with an embodiment of the present invention.

Referring now to FIG. 5, a detailed view of the foot 28 is depicted. The foot 28 preferably comprises of two opposing, angle brackets 50 that are attached to a plate 52 via weld attachment. The angle brackets 50 are generally "L" shaped, however alternative shapes may be employed. Furthermore, while the angle brackets 50 are attached to the plate 52 via weld attachment, alternative attachment methods and/or means may be employed such as bolt, screw and/or adhesive. Moreover, alternative embodiments of the pedal position apparatus 10 may include a foot 28 that is a single, unitary piece. The foot 28 is mounted the shaft 22 of the handle assembly 20 via bolt and nut connection 51 as depicted in FIGS. 1 and 11.

Referring now to FIGS. 6 and 7, the lever arm 14 includes a base 54 and two side walls 56 that extend from the base 54. The side walls 56 each include a pair of side bracket mounting holes 58 and a pin hole 60. The lever arm 14 has a first end 62 having a recess or gap 64 where a portion of the base 54 is removed. This recess 64 is generally convex in shape and extends from the first end 62 approximately 1.2 inches to approximately 1.8 inches inward toward the second end 66. The recess 64 provides a clearance for pivoting of the lever arm 14 relative to the attachment arm 34. Depending upon application and the range of pivot motion desired for the lever arm 14, the recess 64 may be modified and/or changed to have a different contour or shape and/or different size.

As illustrated in FIGS. 6 and 7, the pin holes 60 are located near the first end 62 of the lever arm, adjacent to the recess 64. The pin holes 60 engage the annular grooves 38 of the pin 36. The annular groves 38 of the pin 36 rest within and are retained by the pin holes 60. The pin 36 is retained in position by the pin holes 60 and annular grooves as previously described, and the pin 36 spans the recess 64, extending between the side walls 56 of the lever arm 14.

Referring now to FIG. 7, as previously mentioned, the lever arm 14 has a second end 66 that opposes the first end 62. As illustrated the second end 66 includes a latching feature 68 that latches to, or hooks, the pivot or hinged connection of a brake pedal or the like. The latching feature 68 is generally hook-shaped wherein a portion of each side wall 56 has been cut away or removed to form the latching feature 68. Alternatively, the latching feature 68 may be a separate hook piece or other component that can be attached to the lever arm 14.

The lever arm 14 can extend any length and have varying widths and sizes, depending upon the application, however in one preferred embodiment of the present invention, the lever arm 14 has a length of approximately 16.75 inches and has a width of approximately 3 inches. Moreover, the lever arm 14 is preferably constructed from a piece of square tubing with its top side removed. It may alternatively be constructed from multiple pieces or components attached together. The lever arm 14 can be constructed from suitable metal material and alternatively, may be constructed from any non-metal material strong enough to resist the applied bending loads.

Figure 9:
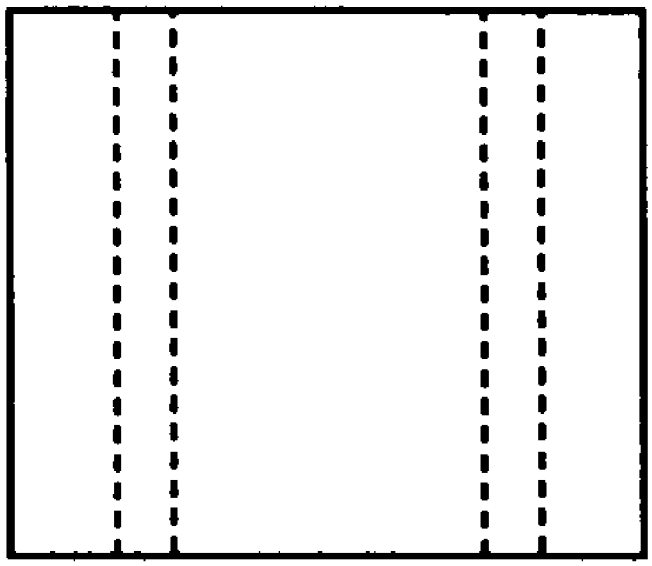
FIG. 9 is a front view of a pad member illustrated in FIG. 8.
Figure 8:
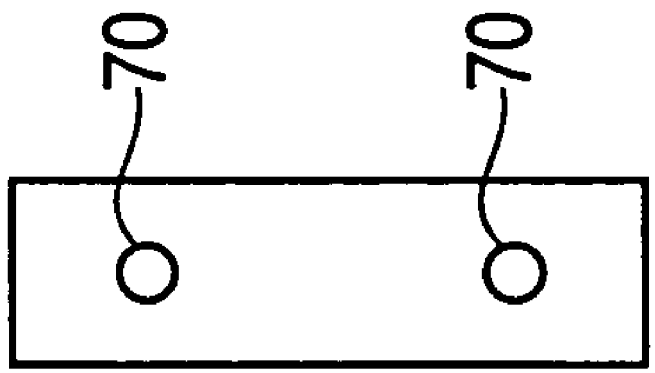
FIG. 8 is a side view of a pad member employed in the pedal positioning apparatus in accordance with an embodiment of the present invention.

Referring now to FIGS. 8 and 9, a pad member 18 that connects to the side brackets 16 is depicted. The pad member 18 has a generally square or rectangular shape. The pad member 18 connects to, and extends between, the side brackets 16 through the holes 70 via screw attachment. The pad member 18 is preferably constructed from materials that do not deform when the pad member 18 engages a brake pedal or the like, such as nylon. The pad member may be alternatively constructed from materials other than nylon, so long as they do not deform easily. Similarly, a pad member having an alternative shape and/or size may also be employed.

Figure 10:
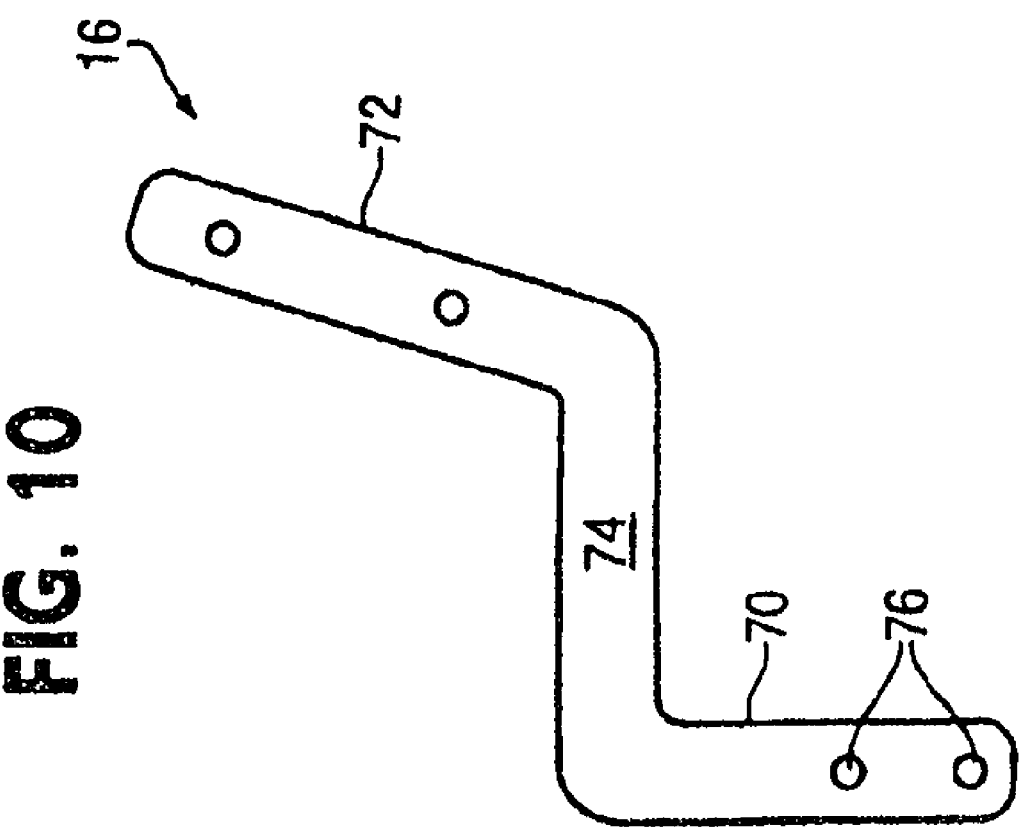
FIG. 10 is a front view of a side bracket.

Referring now to FIG. 10, a side view of one of the side brackets 16 is depicted. As previously described, the pedal positioning apparatus 10 includes two similar side brackets 16. As illustrated in FIG. 10, the side bracket 16 includes a first and second vertical portion 70, 72 with a horizontal portion 74 connecting the two vertical portions 70, 72. The portions 70, 72, 74 are preferably integral with one another, forming a unitary piece, however, the portions 70, 72, 74 may separate pieces or parts attached to one another via weld attachment, for example.

As depicted in FIGS. 1, 2 and 10, the first vertical portion 70 has two mounting holes 76 for mounting the brackets 16 to the lever arm 14. The first vertical portion 70 is oriented generally normal or at a 90° angle to the lever arm 14. The horizontal portion 74 extends at approximately a 90° angle from the first vertical portion 70 generally parallel to the lever arm 14. The second vertical portion 72 extends from the horizontal portion 74 at an approximate 75° angle to the horizontal portion 74. The second vertical portion 72 includes two mounting holes 77 for mounting the pad member 18 to the brackets 16 via screw attachment. Alternative embodiments of the mounting brackets 16 may include portions 70, 72, 74, oriented at varying angles greater or less than those indicated above.

Referring now to FIG. 11, during operation, the pedal positioning apparatus 10 is typically used in combination with a load cell apparatus, generally designated 76, that is mounted to the brake pedal 78. The brake pedal 78 is shown in dashed lines. During operation, the apparatus 10 is initially positioned so that the latching member 68 of the lever arm 14 is latched or hooked around the pivot or hinged connection 80 of the brake pedal 78 as illustrated in FIG. 11. Also, while in this initial position, the foot 28 of the pedal positioning apparatus 10 is positioned flush against the floor of the cockpit of the airplane, so that shaft of the apparatus 10 extends upward therefrom.

Next, the triggers 30, 32 are depressed and the handle 20 is translated upward, along the shaft 22 of the apparatus 10. As the handle 20 translates upwards, the pad member 18 contacts the load cell 76 and pedal 78, applying a force or load to the load cell 76 and pedal 78 causing the pedal 78 to rotate. As the handle 20 is translated further up the shaft 22, the load or force applied to the pedal 78 and load cell 76 increases while the pedal 78 continues to rotate further. Once a desired load and pedal position are achieved, the triggers 30, 32 may be released, locking the handle 20 and preventing it from further translation in either direction. In this position, the load or force applied to the brake pedal 78 varies little and remains constant, while the break pedal 78 position also remains constant. This enables the brake system, or the like, to be tested and/or adjusted precisely, using only one operator if desired, or be tested and/or adjusted without requiring an operator to manually apply and maintain the load force.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A pedal positioning apparatus, comprising:
   a shaft;
   a ratchet assembly comprising:
      a handle translatable along said shaft;
      a handle with an aperture through which said shaft passes;
      an attachment arm that extends from said handle; and
      at least one trigger extending from said handle;
   a lever arm having a first end and a second end, and pivotally connected to said ratchet assembly at said first end of said lever arm; and
   a pad attached to the second end of said lever arm that contacts a pedal and is configured to apply force to said pedal when said ratchet assembly is translated.

2. The pedal positioning apparatus according to claim 1, wherein said handle further comprises a second trigger that is used in combination with said at least one trigger to incrementally translate said ratchet assembly along said shaft.

3. The pedal positioning apparatus according to claim 1, wherein said pivoting connection comprises:
   a pin having a diameter and a longitudinal axis, wherein said pin includes a bore located at an axial location along said pin and wherein said bore extends through the entire diameter of said pin;
   a bolt having a first end and a second end that extends through said attachment arm and through said bore;
   a spacer that is disposed around a portion of said bolt, wherein said spacer is position between said attachment arm and said pin;
   a nut that attaches to said bolt;
   a first washer disposed around said bolt, wherein said first washer is positioned generally at said first end of said bolt trapped between said first end and said attachment arm;
   a second washer disposed around said bolt, wherein said second washer is positioned generally at said second end of said bolt trapped between said nut and said pin.

4. The pedal positioning apparatus according to claim 1, wherein said pad is constructed from a non-deformable material.

5. The pedal positioning apparatus according to claim 1, wherein said pad is a nylon pad.

6. The pedal positioning apparatus according to claim 1, further comprising a foot connected to said shaft.

7. The pedal positioning apparatus according to claim 6, wherein said foot comprises two opposing angle brackets and a plate, wherein each of said two opposing angle brackets is attached to said plate via weld attachment.

8. A pedal positioning apparatus according to claim 1, wherein said lever arm is connected to said attachment arm via a pivoting connection and wherein said lever arm comprises a first side wall, a second side wall, a base extending between said first and second side walls and lying in a plane and a pedal hooking feature oriented at said second end of said lever arm.

9. The pedal positioning apparatus according to claim 8, wherein said lever arm is constructed from square tubing.

10. A pedal positioning apparatus according to claim 8, wherein said pad is attached to said lever arm by a first bracket connected to said first side wall and a second bracket connected to said side wall, wherein said pad extends between said first and second brackets.

11. The pedal positioning apparatus according to claim 10, wherein said first side bracket and said second side bracket each comprise:
   a first vertical portion connected to said lever arm;
   a horizontal portion connected to said first vertical portion; and
   a second vertical portion connected to said horizontal portion.

12. The pedal positioning apparatus according to claim 11, wherein said first vertical portion is oriented approximately 90° angle to the plane and wherein said horizontal portion is oriented generally parallel to the plane and wherein said second vertical portion is oriented at approximately 75° to the plane.

13. A pedal positioning apparatus, comprising:
   a means for supporting the apparatus on a surface;
   a means for clamping onto said supporting means and translating along said supporting means;
   a lever arm having a first end and a second end, and pivotally connected to said clamping means at said first end of said lever arm, wherein said clamping means comprises a handle and at least one trigger operable to translate said clamping means; and
   contacting means attached to the second end of said lever arm for contacting a pedal and applying force to the pedal when said clamping means is translated along said supporting means.

14. The pedal positioning apparatus according to claim 13, further comprising a foot connected to said supporting means on which said supporting means rests.

15. The pedal positioning apparatus according to claim 13, further comprising a pad mounted to said second end of said level arm by at least one bracket.

16. The pedal positioning apparatus according to claim 13, further comprising means for hooking the pedal located at said second end of said lever arm.

17. A method for positioning a pedal and applying a force to a pedal, comprising:
   applying a pedal positioning apparatus to the pedal, wherein the pedal positioning apparatus comprises:
   a shaft;
   a ratchet assembly comprising:
      a handle translatable along said shaft;
      a handle with an aperture through which said shaft passes;

an attachment arm that extends from said handle; and
at least one trigger extending from said handle;
a lever arm having a first end and a second end, and pivotally connected to the ratchet assembly at the first end of the lever arm; and
a pad attached to the second end of the lever arm that contacts the pedal and is configured to apply force to the pedal when the ratchet assembly is translated;
translating the handle in a direction opposite the foot;
contacting the pad with the pedal; and
locking the handle in position on the shaft.

18. A pedal positioning apparatus, comprising:
a ratchet assembly having a handle with an aperture, wherein a shaft passes through said aperture, and having an attachment arm, that extends from said handle, and having at least one trigger;
a lever arm having a first end and a second end, wherein said lever arm is connected to said attachment arm via a pivoting connection, wherein said lever arm comprises a first side wall, a second side wall, a base extending between said first and second side walls and lying in a plane and a pedal hooking feature oriented at said second end of said lever arm;
a bracket assembly attached to said second end of said lever arm; and
a pad member connected to said bracket assembly.

19. A method for positioning a pedal and applying a force to a pedal, comprising:
applying a pedal positioning apparatus to the pedal, wherein the pedal positioning apparatus compnses:
a ratchet assembly having a handle with an aperture, wherein a shaft passes through said aperture, and having an attachment arm, that extends from said handle, and having at least one trigger;
a lever arm having a first end and a second end, wherein said lever arm is connected to said attachment arm via a pivoting connection, wherein said lever arm comprises a first side wall, a second side wall, a base extending between said first and second side walls and lying in a plane and a pedal hooking feature oriented at said second end of said lever arm;
a bracket assembly attached to said second end of said lever arm; and
a pad member connected to said bracket assembly;
translating the handle in a direction opposite the foot;
contacting the pad with the pedal; and
locking the handle in position on the shaft.

* * * * *